United States Patent [19]

Maekawa et al.

[11] Patent Number: 5,039,217
[45] Date of Patent: Aug. 13, 1991

[54] OPTICAL TRANSCEIVER APPARATUS FOR DETECTING DISTANCE BETWEEN TWO CARS

[75] Inventors: Hiroko Maekawa; Hiroyoshi Suzuki; Kenji Ogawa, all of Hyogo, Japan

[73] Assignee: Mitsubishi Denki Kabushiki Kaisha, Tokyo, Japan

[21] Appl. No.: 498,674

[22] Filed: Mar. 26, 1990

[30] Foreign Application Priority Data

Mar. 27, 1989 [JP] Japan .................. 1-75726

[51] Int. Cl.$^5$ .......................... G01C 3/10; G01C 1/00
[52] U.S. Cl. .......................................... 356/1; 356/4;
  356/9; 356/152; 364/424.01; 340/904; 340/942
[58] Field of Search .......................... 356/1, 4, 152, 9;
  180/167, 169; 364/424.01; 340/904, 942

[56] References Cited

U.S. PATENT DOCUMENTS

| | | | |
|---|---|---|---|
| 4,786,164 | 11/1988 | Kawata | 356/4 |
| 4,818,887 | 4/1989 | Weishaupt et al. | 356/1 X |
| 4,926,170 | 5/1990 | Beggs et al. | 180/169 X |

FOREIGN PATENT DOCUMENTS

| | | |
|---|---|---|
| 168178 | 10/1982 | Japan . |
| 203975 | 11/1984 | Japan . |
| 61-6349 | 2/1986 | Japan . |

*Primary Examiner*—Linda J. Wallace
*Attorney, Agent, or Firm*—Sughrue, Mion, Zinn, Macpeak and Seas

[57] ABSTRACT

An apparatus for detecting the distance between one's car and the car ahead, together with the angle between the axes of the two cars. The apparatus has a pair of driving optical systems disposed at a predetermined distance from each other, each driving optical system comprising an optical system having a light projector which projects pulse light having a specific code toward the car which is ahead of the one's car and a light receiver which receives the reflected pulse light from the car ahead, the light projector and receiver being disposed in so close proximity to each other that the respective optical axes can be considered to be on substantially the same axis, and a driving system for adjusting the angle of projection of the light projector on the basis of a signal from the light receiver. The apparatus further has a central processing unit which measures the angle of projection of the pulse light from the light projector when the light receiver of each of the driving optical systems detects the reflected pulse light, thereby detecting the distance between the one's car and the car ahead, together with the angle between the axes of the two cars.

7 Claims, 6 Drawing Sheets

OPTICAL TRANSCEIVER APPARATUS FOR DETECTING DISTANCE BETWEEN TWO CARS

BACKGROUND OF THE INVENTION

1. Field of the Invention

The present invention relates to an apparatus for detecting the distance between one's car and the car ahead (the apparatus being hereinafter referred to as "car distance detecting apparatus"), which is designed so that a light projector and a light receiver which are mounted on one's car are automatically rotated so as to be aimed at a reflector mounted on the car ahead to project pulse light which has a specific code from the light projector onto the car ahead and receive the reflected light from the reflector by the light receiver, thereby detecting the distance between the one's car and the car ahead, together with the angle between the axes of the two cars, by measuring the angle of projection of the optical system.

2. Description of the Prior Art

An active distance measuring apparatus has heretofore been known which is arranged such that, with a light projector and a light receiver spaced apart from each other by a predetermined base line distance, pulse light is projected from the light projector toward an object of measurement, with the light receiver being rotated, and the angle of the light receiver when detecting the reflected light from the object is detected to thereby detect the distance to the object. Such a distance measuring apparatus has been utilized, for example, for the automatic focusing system of cameras.

The principle of the conventional distance measuring apparatus is shown in FIG. 6. Referring to FIG. 6, the reference numeral 11 denotes a light emitting element, for example, an infrared LED (light Emitting Diode), and 9 a light projecting lens, which constitute in combination a light projector.

The reference numeral 12 denotes a photoelectric transducer, for example, a photodiode or PSD (Position Sensitive Device), and 10 a light receiving lens, which constitute in combination a light receiver.

The reference numeral 19 denotes an object of measurement, while the reference symbol D denotes a predetermined base line distance, and L the distance to the object 19. Here, L can be obtained as being $L = D \times \tan\theta$.

In operation, the light emitted from the light emitting element 11 is condensed through the light projecting lens 9 to irradiate the object 19, and the reflected light from the object 19 is condensed through the light receiving lens 10 and received by the photoelectric transducer 12 where the distance L to the object 19 is obtained as being $L = D \times \tan\theta$.

The conventional distance measuring apparatus suffers, however, from the following problems. That is, the object 19 must be present on the optical axis of the light projector. In the case of a camera, the user can put the object 19 on the optical axis of the light projector by moving the camera himself. In the case where such a distance measuring apparatus is used to detect the distance between one's car and the car ahead, however, the driver must adjust the position of the light projector so that the car ahead is put on the optical axis of the light projector every time the distance between the two cars is desired to detect, which loads the driver so heavily that safe driving is disturbed.

When the light projector is fixed, on the other hand, detection of the distance is difficult and extremely low in terms of reliability in the case of a car distance detecting apparatus in which the change of the axis of one's car and that of the car ahead are not correlated to each other.

SUMMARY OF THE INVENTION

In view of the above-described problems of the prior art, it is a primary object of the present invention to provide a car distance detecting apparatus which is designed so that it is possible to detect the distance between one's car and the car ahead at all times independently of the angle between the axes of the one's car and the car ahead, and also possible to detect the angle between the axes of the two cars.

To this end, the present invention provides an apparatus for detecting the distance between one's car and the car ahead, comprising: a pair of driving optical systems provided on the one's car at a predetermined distance from each other, each driving optical system comprising an optical system having a light projector which projects pulse light having a specific code toward the car which is ahead of the one's car and a light receiver which receives the reflected pulse light from the car ahead, the light projector and receiver being disposed in so close proximity to each other that the respective optical axes can be considered to be on substantially the same axis, and a driving system for adjusting the angle of projection of the light projector on the basis of a signal from the light receiver; and a central processing unit provided on the one's car to control the rotation of the pair of driving optical systems and detect the angle of projection of the pulse light from the light projector when the light receiver of each of the driving optical systems detects the reflected pulse light, thereby detecting the distance between the one's car and the car ahead, together with the angle between the axes of the two cars.

Thus, under the control of the central processing unit, the driving systems of the pair of driving optical systems are driven to rotate the pair of associated optical systems so that the optical axes of the optical systems are automatically aligned with the car ahead, and pulse light having a specific code is projected from each light projector onto the car ahead. The angle of projection of each optical system at the time when the reflected pulse light from the car ahead is received by the light receiver is measured by the central processing unit, thereby measuring the distance between the one's car and the car ahead, together with the angle between the axes of the two cars, and thus detecting the position of the car ahead relative to the one's car.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements, and of which.

DESCRIPTION OF THE PREFERRED EMBODIMENT

One embodiment of the car distance detecting apparatus according to the present invention will be described below in detail with reference to the accompanying drawings.

Figure 1:
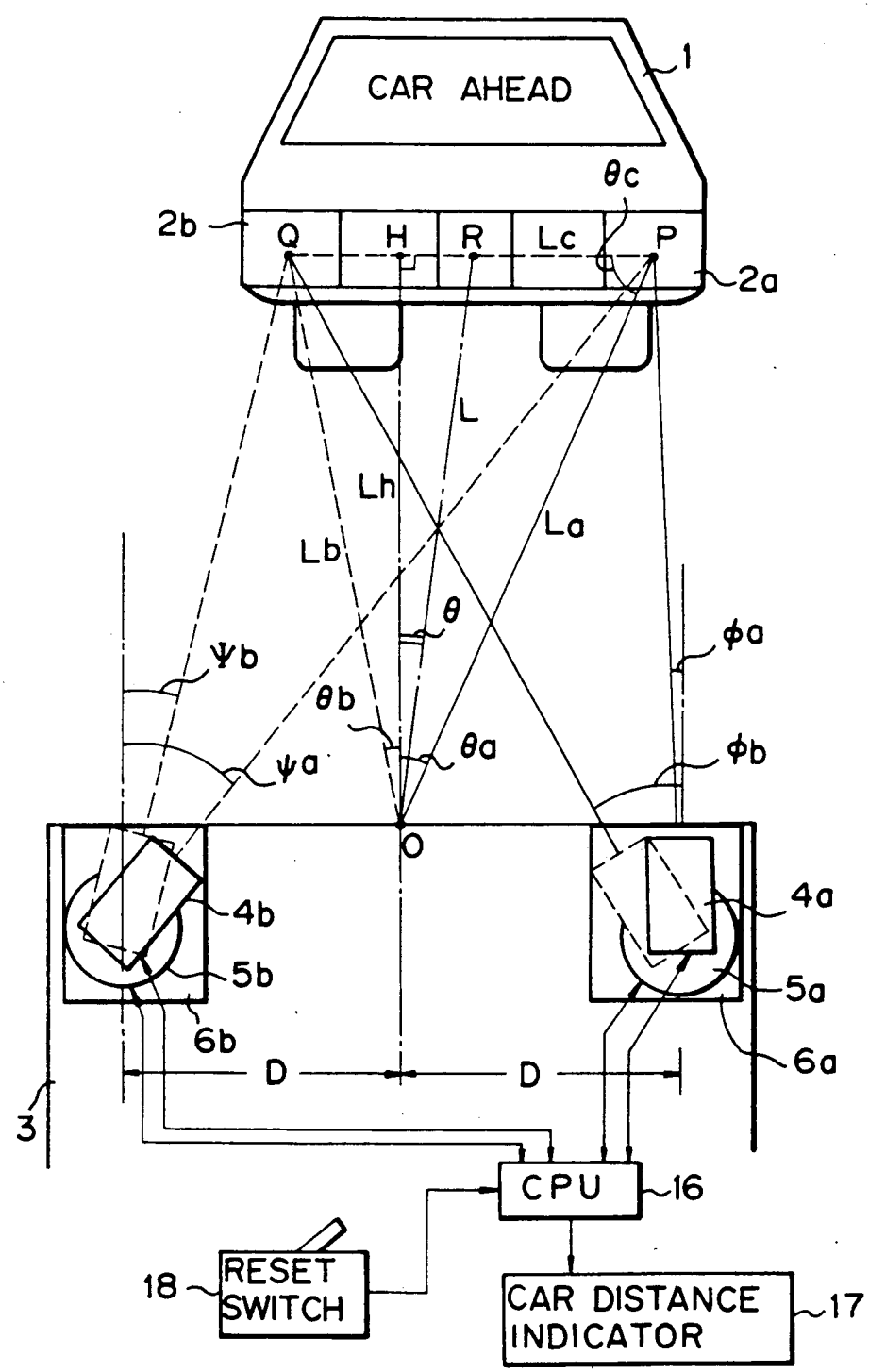
FIG. 1 is a block diagram of one embodiment of the car distance detecting apparatus according to the present invention.

Referring first to FIG. 1, which is a block diagram of one embodiment of the present invention, the car distance detecting apparatus includes optical systems 4a and 4b each having a light projector (not shown) for projecting pulse light having a specific code and a lighter receiver (not shown) for receiving the reflected pulse light from a car 1 which is ahead of one's car 3, each light projector and associated light receiver being disposed such that their respective optical axes can be regarded as substantially identical with each other. The optical systems 4a and 4b are driven to rotate by respective driving systems 5a and 5b. The combinations of the optical systems 4a, 4b and the driving systems 5a, 5b constitute a pair of driving optical systems 6a and 6b, respectively.

The driving optical systems 6a and 6b are each installed at a distance D from the center of the forward end of the one's car 3. A central processing unit (hereinafter referred to as "CPU") 16 and a car distance indicator 17 are installed in the vicinity of an interior panel of the car, such as the dashboard.

Rays of pulse light having specific pulse codes are respectively projected from the light projectors of the optical systems 4a and 4b of the driving optical systems 6a and 6b toward reflectors 2a and 2b provided on the car 1 ahead, and the reflected rays of pulse light from the reflectors 2a and 2b are received by the light receivers of the optical systems 4a and 4b. At this time, the CPU 16 measures the angles $\phi a$, $\phi b$, 104 a and 104 b made between the optical axes of the optical systems 4a, 4b rotated and the respectively corresponding lines perpendicular to the one's car 3, thereby determining the length L of the imaginary line RO between the center R of the rear end of the car 1 ahead and the center O of the forward end of the one's car 3, as being the distance between the two cars.

The CPU 16 also obtains the angle $\theta$ made between the line RO and the line HO perpendicular to the one's car 3.

In this embodiment, pulse codes which are different from each other, for example, in the frequency of light emitted, or the duty ratio, are employed in order to prevent confusion between the reflected rays of pulse light received by the optical systems 4a and 4b, and the measurement of angles of the reflected rays of pulse light is therefore conducted in the following sequence: $\phi a$, $\phi b$, $\psi a$ and $\psi b$.

It should be noted that the reference numeral 18 denotes a reset switch actuated to reset the CPU 16 to its initial state.

The operation of the embodiment will next be explained with reference to FIG. 2.

Figure 2:
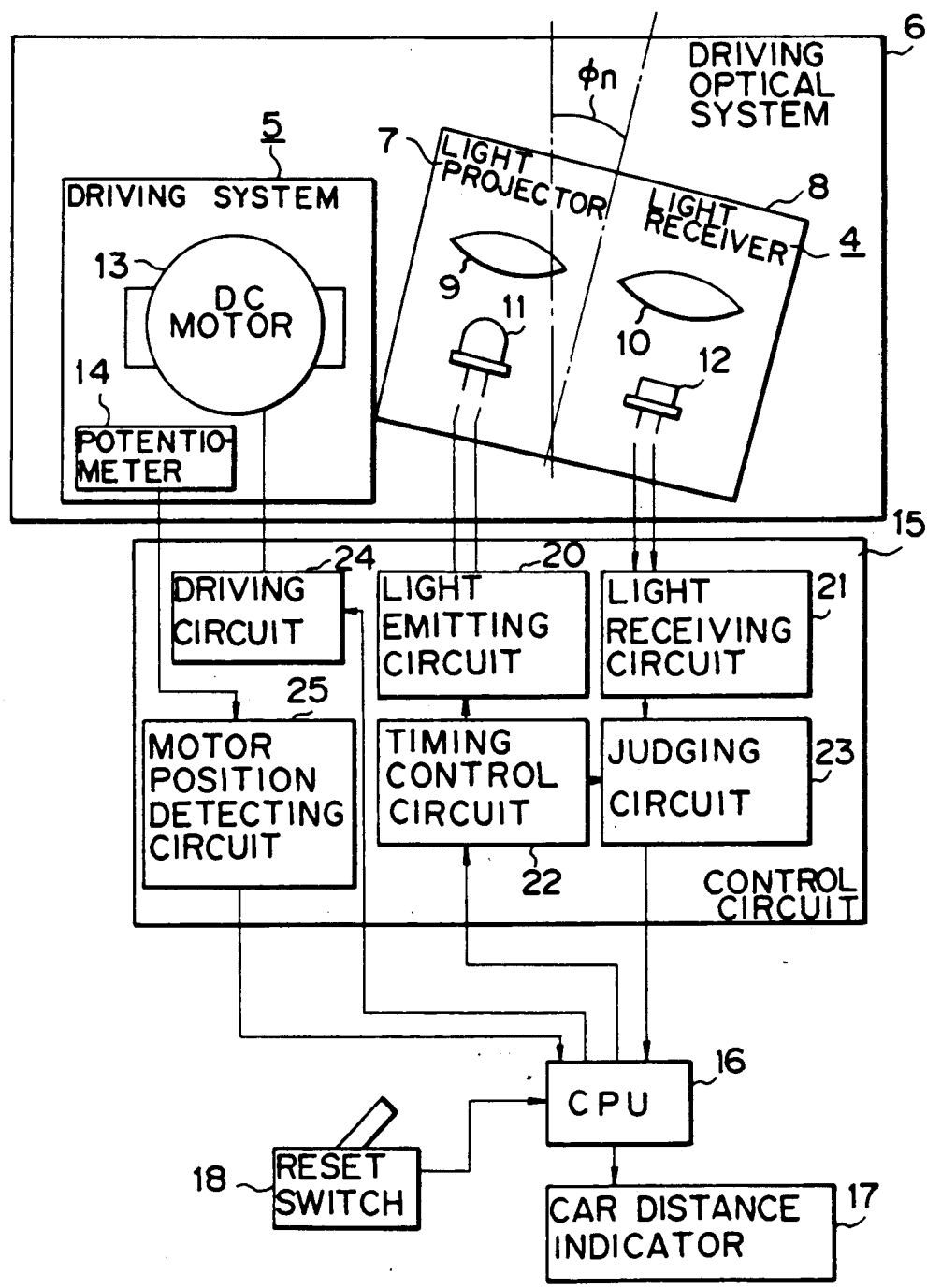
FIG. 2 is a block diagram schematically showing the arrangement of one driving optical system and its peripheral units in the embodiment.

FIG. 2 schematically shows either one of the driving optical systems 6a and 6b in the embodiment shown in FIG. 1, together with peripheral units thereof.

Since the driving optical systems 6a and 6b have the same arrangement, the constituent members of the driving optical system and those of the internal arrangement thereof shown in FIG. 2 are denoted by respective reference numerals having no alphabet "a" or "b" suffixed thereto.

Referring to FIG. 2, an LED 11 and a photoelectric transducer 12 in one optical system 4 uses the same frequency band. The LED 11 that is provided in a light projector 7 of the optical system 4 is activated to emit light in response to a pulse signal generated in a light emitting circuit 20 which is synchronized with a timing control circuit 22, which are provided in a control circuit 15, and rays of pulse light are thereby projected in the direction of travel of the one's car through a light projecting lens 9 so that a predetermined solid angle is made.

If the light rays projected from the light projector 7 are reflected from the reflector 2a or 2b of the car 1 ahead and enter a light receiver 8 which is disposed on substantially the same axis as that of the light projector 7, the reflected rays of light are condensed through a light receiving lens 10 and the quantity of light received is photo-electrically converted by a photoelectric transducer 12. The output of the photoelectric transducer 12 is detected as being a light quantity signal in a light receiving circuit 21.

The CPU 16 reads the light quantity signal which has been subjected to noise processing in a judging circuit 23 to which are inputted the light quantity signal from the light receiving circuit 21 and a pulse signal synchronized with the timing control circuit 22, and the CPU 16 outputs a signal $\phi n$ to a driving circuit 24 so that the position of the optical system 4 reaches the angle $\phi n$ at which the maximum light quantity is detected. In response to the signal $\phi n$, the driving circuit 24 drives a DC motor 13 in the driving system 5.

The value $\phi 0$ of a potentiometer 14 is read by a motor position detecting circuit 25, and the CPU 16 feedback-controls the DC motor 13 with regard to the position of rotation of the motor 13 by use of a correction coefficient which is determined by $\phi n$ and $\phi 0$.

Figure 5:
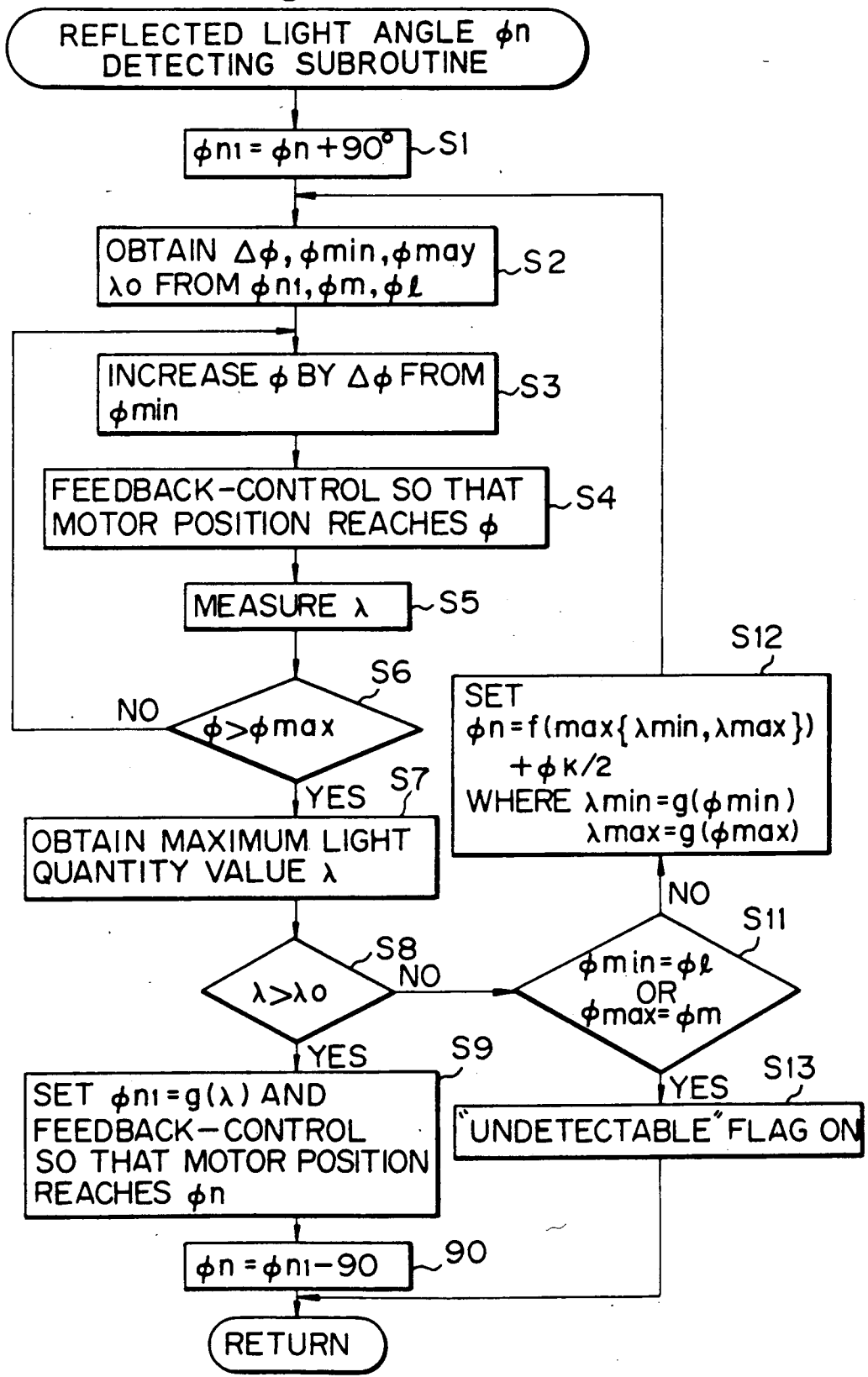
FIG. 5 is a flowchart showing a subroutine for detecting the angle of the reflected light in the arrangement shown in FIG. 2.
Figure 6:
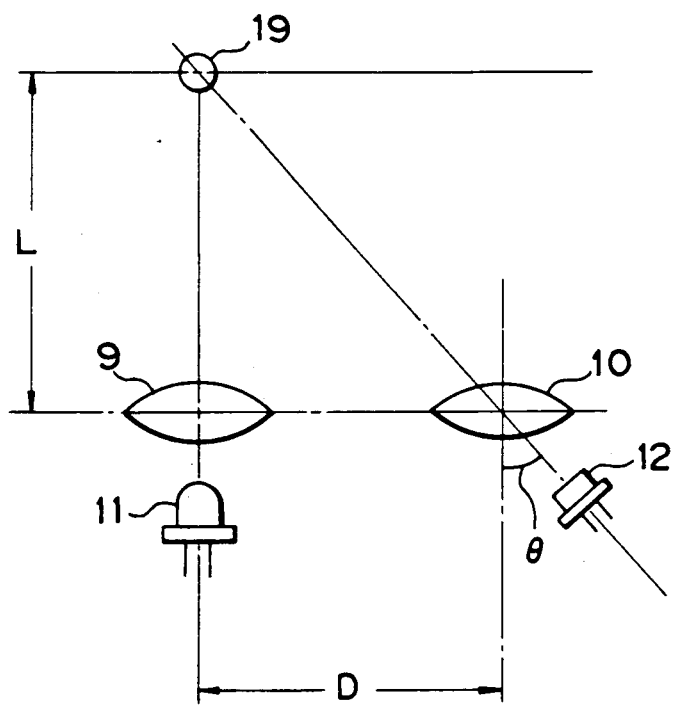
FIG. 6 is a diagram showing the principle of a conventional active distance measuring apparatus.

The angles $\phi a$, $\phi b$, $\psi a$ and $\psi b$ of the reflected rays of pulse light shown in FIG. 1 are obtained by measuring the angle $\phi n$, where the maximum light quantity is detected, with respect to each of the driving optical systems 6a and 6b by use of the above-described means, the measurement being conducted according to the flowchart of the subroutine for detecting the angle $\phi n$ of the reflected rays of light, shown in FIG. 5. The flowchart of FIG. 5 will be explained below.

In Step S1, the angle $\phi n$ between the axis of the optical system 4 and the line perpendicular to the one's car 3 is converted to the angle $\phi n1$ according to the following equation (1), on the assumption that a line perpendicular to the one's car 3 which passes through the optical system 4 is the Y-axis and the front end face of the one's car 3 is the X-axis, for simplification of computation:

$$\phi n1 = \phi n + 90° \tag{1}$$

In this embodiment, when the power supply for the apparatus has just been turned on, or when the reset switch 18 has just been turned on, or when no reflected rays of pulse light are detected, the CPU 16 judges the system to be in its initial state and defines the angle $\phi n$ as being $\phi n = 0°$, the CPU 16 renews the value of the angle $\phi n$ just before the end of the subroutine, i.e., in Step S10.

In Step S2, angles $\phi$min and $\phi$max (where $\phi$min < $\phi$max) of an angle range within which the optical system 4 is to be actually moved and a light quantity comparison value $\lambda_0$ are obtained from the angle $\phi n1$ obtained in Step S1, together with the maximum and minimum angles $\phi m$ and $\phi l$ of the angle range within which the optical system 4 can be mechanically moved.

For example, if the CPU 16 judges the system to be in its initial state on the basis of the above-mentioned condition, the angles $\phi$min and $\phi$max of the rotation angle range are set to 0° and 180°, respectively, and the light quantity comparison value $\lambda_0$ is set to the maximum value of the outputs of the judging circuit 23 caused by noises such as disturbing light, which have previously been measured. If the system is judged to be not in its initial state, it means that the subroutine for detecting the car distance L has already been executed at least once; therefore, the light quantity comparison value $\lambda_0$ is set to the estimated maximum light quantity value $\lambda_1$ previously determined in correspondence with the detected car distance L, and the angles $\phi$min and $\phi$max of the rotation angle range are set on the basis of $\phi n1$ renewed before the completion of the preceding subroutine so as to be within the range defined by the maximum and minimum angles $\phi m$ and $\phi l$ where the optical system 4 can be mechanically moved, as expressed by the following equations (2) and (3):

$$\phi\text{min} = \max\{\phi l, \phi n] - 10°\} \tag{2}$$

$$\phi\text{max} = \min\{\phi m, \phi n1 + 10°\} \tag{3}$$

In Step S3, the motor target angle $\phi$ is increased by a predetermined angle $\Delta\phi$ of movement from the angle $\phi$min obtained in Step S2.

In Step S4, feedback control is effected in the manner already stated above so that the position of the DC motor 13 reaches the target angle $\phi$ determined in Step S3.

In Step S5, the light quantity $\lambda = f(\phi)$ measured at this time is stored in memory in correspondence with the angle $\phi$, that is, in the form of a pair of pieces of data, i.e., ($\phi$, $\lambda$).

It should be noted that g represents the correspondence of the light quantity $\lambda$ to the angle $\phi$ stored in the memory at the angle $\phi$, whereas f represents the correspondence of the angle $\phi$ to the light quantity $\lambda$, conversely.

In Step S6, the angle $\phi$ and the maximum rotation angle $\phi$max are compared with each other. If $\phi \leq \phi$max, the process returns to Step S3. If $\phi > \phi$max, the process proceeds to Step S7.

In Step S7, the maximum value $\lambda$ of the light quantity values obtained in the angle range from the angle $\phi$min to the angle $\phi$max is obtained.

In Step S8, the light quantity comparison value $\lambda_0$ determined in Step S1 on the basis of a predetermined condition is compared with the maximum light quantity value $\lambda$. If $\lambda < \lambda_0$, the detected light quantity value is judged to be invalid, and the process then proceeds to Step S11, whereas, if $\lambda \leq \lambda_0$, the detected light quantity value is judged to be valid, and the process then proceeds to Step S9.

In Step 9, the angle $\phi = g(\lambda)$ corresponding to the maximum light quantity value $\lambda$ is obtained from the data concerning the relationship between the angle and the light quantity stored in memory in Step S5, and $\phi = \phi n1$ is set. Then, feedback control is effected so that the motor position reaches the target angle $\phi$.

In Step S10, the angle $\phi n1$ defined on the assumption that a line perpendicular to the one's car 3 which passes through the optical system 4 is the Y-axis and the front end face of the one's car 3 is the X-axis is converted to the angle $\phi n$ between the axis of the optical system 4 and the line perpendicular to the one's car 3 according to the equation (1) in the same way as in Step S1, thus completing the processing.

In Step S11, it is judged whether or not the maximum angle $\phi m$ of the angle range within which the optical system 4 can be mechanically moved is equal to the angle $\phi$max obtained in Step S1 or whether or not the minimum angle $\phi$ is equal to the angle $\phi$min. If YES, the process proceeds to Step S13, in which a flag which indicates that no reflected rays can be detected is turned on, thus completing the processing. If NO is the answer in Step S11, the process proceeds to Step S12.

In Step S12, the angle $\phi n1$ is obtained from the following equation (4) with the light quantity values corresponding to the angles $\phi$min and $\phi$max being set to $\lambda$min = g($\phi$min) and $\lambda$max = g($\phi$max), respectively, and the process then returns to Step S2:

$$\phi = f(\max\{\lambda\text{min}, \lambda\text{max}\}) + 10° \tag{4}$$

By the above-described procedure, the angle $\phi n$ of the reflected rays of pulse light can be detected.

Figure 3:
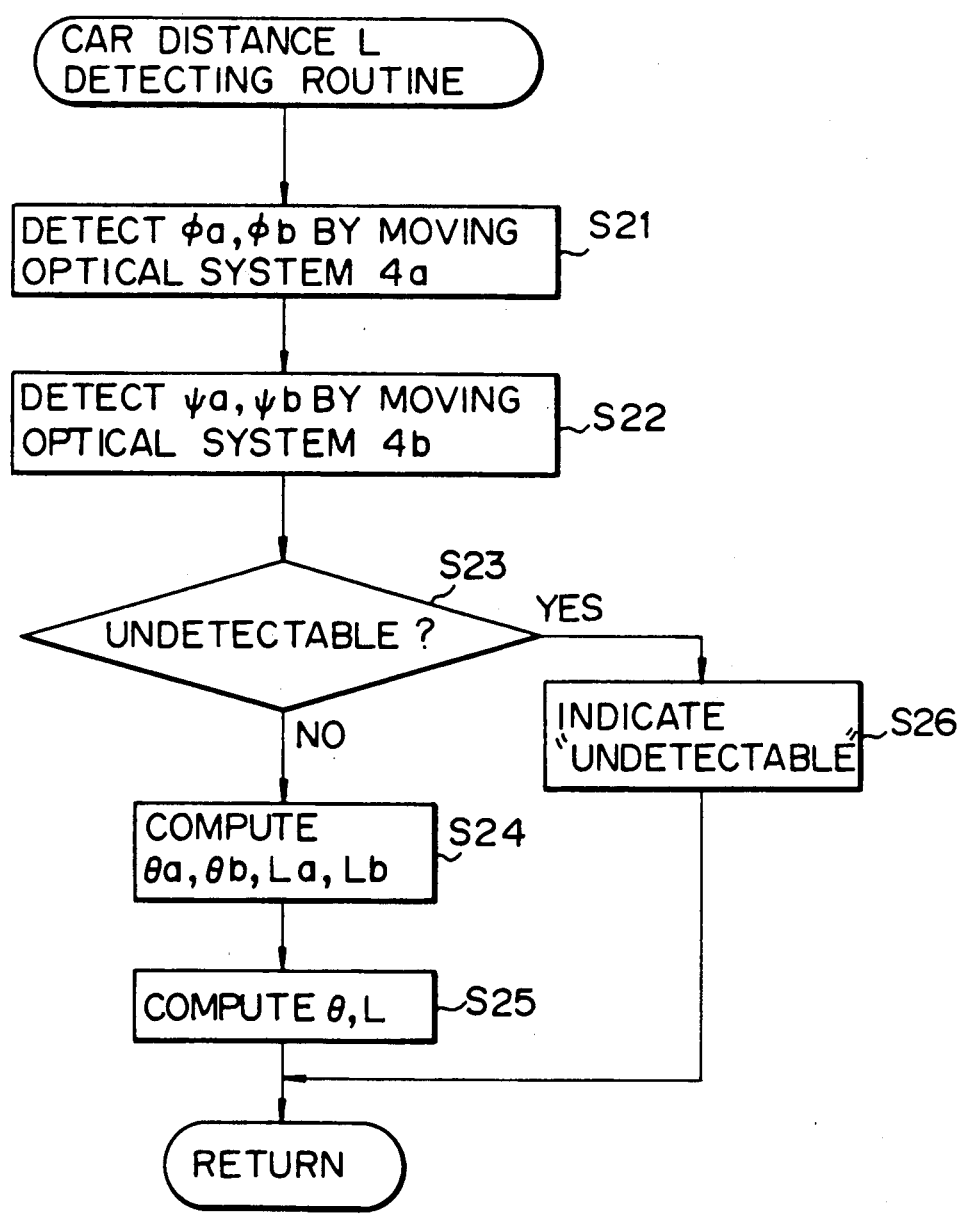
FIG. 3 is a flowchart showing a subroutine for detecting the distance between two cars in the embodiment.

In this embodiment, after the angles $\phi a$, $\phi b$, $\psi a$ and $\psi b$ between the reflected rays of light received by the optical systems 4a, 4b and the corresponding lines perpendicular to the one's car 3 shown in FIG. 1 are detected by the above-described procedure, the length L of the imaginary line RO between the center R of the rear end of the car 1 ahead and the center O of the forward end of the one's car 3 is obtained, together with the angle $\theta$ between the line RO and the line HO perpendicular to the one's car 3. The method of obtaining the length L of the line RO and the angle $\theta$ will next be explained with reference to the flowchart of FIG. 3 that shows the subroutine for detecting the distance L between the two cars.

In Step S21, with the optical system 4a being moved, the angles $\phi a$ and $\phi b$ between the axis of the optical system 4a and the line perpendicular to the one's car 3 at the time when the reflected rays of pulse light are detected by the optical system 4a are obtained. In Step S22, similarly, with the optical system 4b being moved, the angles $\psi a$ and $\psi b$ between the axis of the optical system 4b and the line perpendicular to the one's car 3 at the time when the reflected rays of pulse light are detected by the optical system 4b are obtained.

In Step S23, it is judged whether or not the flag indicating that no reflected rays can be detected is ON. If YES, it is judged that it is impossible to detect the distance between the two cars, and the process then proceeds to Step S26, in which the car distance indicator 17 is instructed to indicate that it is impossible to detect the car distance, thereby informing the driver of this fact. If the flag is OFF, the process proceeds to Step S24.

In Step S24, the distances La and Lb between the reflectors 2a, 2b and the one's car 3 shown in FIG. 1, together with the angles θa and θb between the axis of the one's car 3 and the imaginary lines respectively connecting the center 0 of the forward end of the one's car 3 and the reflectors 2a and 2b are obtained by use of the angles θa, θb, ψa and ψb detected in Steps S21 and S22.

Figure 4:
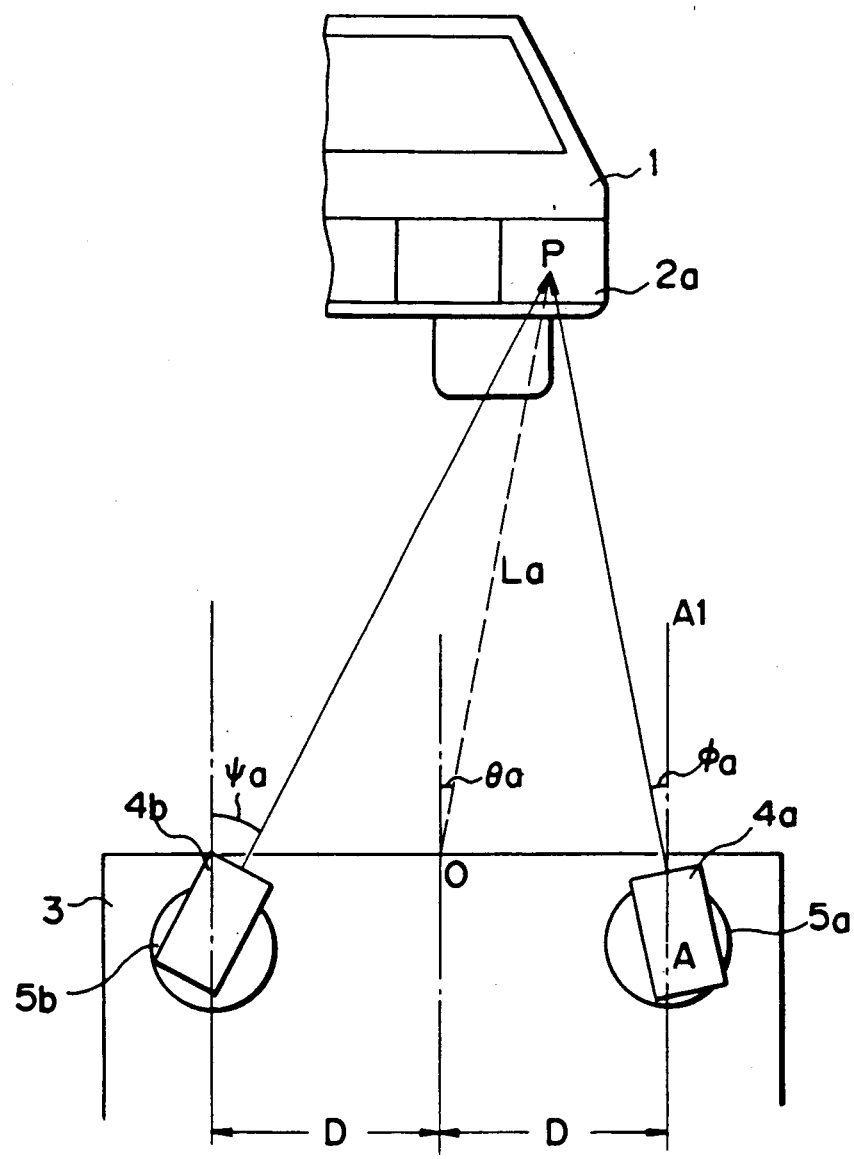
FIG. 4 is a diagram showing the way of obtaining the distance between the one's car and a reflector provided on the car ahead and the angle between the axis of one's car and the imaginary line connecting the one's car and the reflector on the car ahead in the embodiment.

FIG. 4 shows the way of obtaining the distance La between the reflectors 2a and the one's car 3 and the angle θa between the axis of the one's car 3 and the imaginary line connecting the center O of the forward end of the one's car 3 and the reflector 2a. The description will further be set fort below with reference to FIG. 4.

The angle φa is made between the line AA1 perpendicular to the one's car 3 and passing through the optical system 4a and the line AP connecting the optical system 4a and the reflector 2a. With the angle φa and the angle ψa which is defined in the same way as in the case of the angle φa, the following equations (5) and (6) are obtained on the basis of the trigonometrical measurement, and it is thereby possible to obtain the angle θa between the axis of the one's car 3 and the imaginary line connecting the center O of the forward end of the one's car 3 and the reflector 2a and the distance La between the reflector 2a and the one's car 3.

$$\theta a = (\tan\phi a + \tan\psi a)/2 \qquad (5)$$

$$La = D/\{\cos\theta a * (\tan\phi - \tan\theta a)\} \qquad (6)$$

In a simpler system, the distance La and the angle θa may be utilized as pieces of information which are approximately considered to be the distance between the two cars and the angle between the axis of the two cars, respectively.

Similarly, the angle θb and the distance Lb are obtained, and the process proceeds to Step S25.

In Step S25, the distance L between the two cars and the angle θ between the two cars are obtained on the basis of the angles θa, θb and the distances La, Lb, thus completing the processing. The principles on the basis of which the car distance L and the angle θ are obtained will be explained below.

With regard to the triangle POQ shown in FIG. 1, the length Lc of the line PQ is obtained from the following equation (7) on the basis of the cosine theorem, while the angle θc between the lines PQ and PO is obtained from the following equation (8) on the basis of the sine theorem:

$$Lc^2 = La^2 + Lb^2 - 2*La*Lb*\cos\{|\theta a + \theta b|\} \qquad (7)$$

$$Lc/\sin\{|\theta a + \theta b|\} = Lb/\sin\theta c \qquad (8)$$

With regard to the triangle PRO, where R is the middle point of the line PQ, the length L of the line RO is obtained from the following equation (9) on the basis of the cosine theorem:

$$L^2 = (Lc/2)^2 + La^2 - (Lc/2)*La*\cos\theta c \qquad (9)$$

On the other hand, the length Lh of the perpendicular OH from the center of the forward end of the one's car 3 to the car 1 ahead is obtained from the following equation (10). and the angle θ is readily obtained from the following equation (11):

$$\cos\theta a = Lh/La \qquad (10)$$

$$\cos\theta = Lh/L \qquad (11)$$

The car distance detecting apparatus of this embodiment indicates on the car distance indicator 17 the car distance L and the angle θ that are detected every predetermined period of time on the basis of the above-described principles and, if the car distance L becomes less than a predetermined critical car distance, the apparatus informs the driver of this dangerous situation by means of an alarm sound and a particular indication. Thus, the car distance detecting apparatus of this embodiment is additionally provided with a collision preventing system function. The apparatus is further adapted to provide indication of an error when it is impossible to effect detection due to disturbing light or other disturbance.

Although in the foregoing embodiment the motor 13 provided in the driving system 5 is a DC motor, it may also be other types of motor, for example, a stepping motor, as long as the motor employed enables absolute position control. In addition, if the light projectors of the optical systems 4a and 4b have different pulse codes and there is no fear of these pulse codes being confused with each other by virtue of provision of, for example, a disturbing light eliminating circuit, the sequence of measurement of the angles between the optical systems 4a, 4b and the corresponding lines perpendicular to the one's car 3 is not necessarily limited to the aforementioned one, i.e., φa, φb, ψa and ψb, but may be determined as desired.

Since the car distance detecting apparatus according to the present invention enables the position of the car 1 ahead relative to the one's car 3 to be detected on the basis of the angle θ and the distance L between the one's car 3 and the car 1 ahead, it can also be utilized as a constituent element of an automatic tracking control system for automatically tracking the car 1 ahead.

In a simpler system, the arrangement may be such that, among the distances La and Lb between the reflectors 2a, 2b and the one's car 3 and the angles θa and θb between the reflectors 2a, 2b and the axis of the one's car 3, which are shown in FIG. 1, La and θa or Lb and θb are obtained and utilized as pieces of information which can be approximately considered to be the distance between the two cars and the angle between the axes of the two cars, respectively.

Thus, according to the present invention, a pair of optical systems each having a light projector and a light receiver disposed in such a manner that the respective optical axes are on substantially the same axis are driven to rotate by the associated driving systems so as to project pulse light having a specific code from each light projector onto the car ahead, and at the same time as the reflected rays of pulse light from the car ahead are received by the light receivers, the distance between the one's car and the car ahead is detected, together with the angle between the axes of the two cars. Accordingly, it is possible to enable the light projectors and the light receivers to be automatically rotated so as to be aimed at the car ahead and to project and receive pulse light having a specific code. Thus, by measuring the angle of projection of each optical system, it is possible to obtain the distance between the one's car and the car ahead, together with the angle between the axes of the two cars, with high reliability, without imposing any burden on the driver.

Although the present invention has been described through specific terms, it should be noted here that the described embodiment is not necessarily exclusive and that various changes and modifications may be imparted thereto without departing from the scope of the invention which is limited solely by the appended claim.

What is claimed is:

1. An apparatus for detecting the distance between one's car and a car ahead, comprising:
    a pair of driving optical systems provided on the one's car at a predetermined distance from each other, each driving optical system comprising an optical system having a light projector which projects pulse light having a specific code toward the car which is ahead of the one's car and a light receiver which receives reflected pulse light from said car ahead, said light projector and receiver being disposed in such a close proximity to each other that their respective optical axes can be considered to be on substantially the same axis, and a driving system for rotatably adjusting an angle of projection of said light projector on the basis of a signal from said light receiver; and
    a central processing unit provided on the one's car to measure the angle of projection of said pulse light from each light projector when said light receiver of each of said driving optical systems detects said reflected pulse light, thereby detecting the distance between said one's car and said car ahead, together with an angle between longitudinal axes of said two cars.

2. An apparatus of claim 1 wherein the pulse light projected by one of the light projectors has a specific code which is different from another specific code projected by the other of the light projectors.

3. An apparatus of claim 1 wherein an angle of projection of pulse light from one of said light projectors is measured after an angle of projection of pulse light from the other of said light projectors has been measured.

4. An apparatus of claim 1 wherein said driving optical systems are each installed at the same distance from a center of the forward end of the one's car.

5. An apparatus of claim 1 wherein the car ahead has a pair of horizontally spaced reflectors (2a, 2b) toward which rays of pulse light having specific pulse codes are respectively projected from the light projectors of the optical systems of the driving optical systems; the reflected rays of pulse light from the reflectors are received by the light receivers of the optical systems so that the central processing unit measures the angles ($\psi a$, $\psi b$, $\phi am$, $\phi b$) between the optical axis of each rotatably adjusted optical system and a line perpendicular to the one's car when the respective light receives detect maximum light quantities; the central processing unit obtains on the basis of the measured angles the length of an imaginary line (RO) between the center of the rear end of the car ahead and the center of the forward end of the one's car, together with the angle between said imaginary line and the line perpendicular to the one's car.

6. An apparatus of claim 1 wherein the car ahead has at least one reflector toward which rays of pulse light having specific pulse codes are respectively projected from the light projectors of the optical systems of the driving optical systems; the reflected rays of pulse light from the reflector are received by the light receivers of the optical systems so that the central processing unit measures the angles between the optical axis of each rotatably adjusted optical system and a line perpendicular to the one's car when the respective light receivers detect maximum light quantities; the central processing unit obtains on the basis of the measured angles the length of an imaginary line between said reflector and the center of the forward end of the one's car, together with the angle between said imaginary line and the line perpendicular to the one'car.

7. An apparatus of claim 1 wherein said apparatus further comprises an indicator on which the distance between said one's car and said car ahead and the angle between the axes of said two cars are displayed.

* * * * *